United States Patent

Brown

[11] Patent Number: 5,884,303
[45] Date of Patent: Mar. 16, 1999

[54] PARALLEL SEARCHING TECHNIQUE

[75] Inventor: Anthony Peter Graham Brown, Camberley, England

[73] Assignee: International Computers Limited, London, United Kingdom

[21] Appl. No.: 796,257

[22] Filed: Feb. 6, 1997

[30] Foreign Application Priority Data

Mar. 15, 1996 [GB] United Kingdom .................. 9605473

[51] Int. Cl.$^6$ .................................................. G06F 17/30
[52] U.S. Cl. .................................... 707/3; 707/10; 707/2
[58] Field of Search ...................... 707/2, 10, 3

[56] References Cited

U.S. PATENT DOCUMENTS

| | | | |
|---|---|---|---|
| 4,967,341 | 10/1990 | Yamamoto et al. | 364/200 |
| 4,991,087 | 2/1991 | Burkowski et al. | 364/200 |
| 5,301,310 | 4/1994 | Isman et al. | 395/575 |
| 5,542,064 | 7/1996 | Tanaka et al. | 395/441 |
| 5,701,473 | 12/1997 | Braseth et al. | 707/205 |
| 5,715,443 | 2/1998 | Yanagihara et al. | 707/3 |
| 5,745,915 | 4/1998 | Cooper et al. | 711/114 |

FOREIGN PATENT DOCUMENTS 0 625 756  11/1994  European Pat. Off. .

OTHER PUBLICATIONS

Dewitt et al., "Parallel database system: The future of high performance database systems", Communications of the association for computing machery, vol. 35, No. 6, pp. 85–89, Jun. 1992.

Dwyer, "Some Experiences with a Distributed Database Testbed System", Proceedings of the IEE, vol. 75, No. 5, May, 1987, pp. 633–648.

Kawano, "Integrated Utilization of Heterogeneous Database Systems through a Database Network", Mapping New Applications Onto New Technologies, Mar. 8, 1988, pp. 253–259.

DeWitt, "Parallel Database Systems: The Future of High Performance Database Systems", Communications of the Association for Computing Machinery, vol. 35, No. 6, Jun. 1, 1992, pp. 85–98.

Primary Examiner—Paul R. Lintz
Assistant Examiner—Jean M. Corrielus
Attorney, Agent, or Firm—Lee, Mann, Smith, McWilliams, Sweeney & Ohlson

[57] ABSTRACT

A parallel query manager accepts a list of file extents to be searched and produces a number of search lists, one for each disk to be searched. The query manager first uses a mapper to find out how the database spaces are stored on disk. It then matches the search extent list with the mapping information to determine which parts of which disks are to be searched. It then initiates several searches in parallel so that all the affected disks can be kept busy at the same time. The query manager then checks for return data on each stream, and merges the results.

7 Claims, 4 Drawing Sheets

PARALLEL SEARCHING TECHNIQUE

BACKGROUND OF THE INVENTION

This invention relates to a parallel searching technique. The invention is particularly, although not exclusively, concerned with a technique for parallel searching of a relational database.

In a relational database management system (RDBMS), the database storage space comprises one or more files, which are typically stored on a number of disks. When searching a relational database, it is desirable for the RDBMS to be able to read each of these files as fast as possible. Various solutions to this have been proposed.

In a first proposed solution, the file is split into fragments and these fragments are stored in separate data spaces. When the file is to be searched, a separate thread is initiated for each fragment and process scheduling, thread scheduling and multiple processor hardware being used to keep all threads busy. The threads may or may not interfere with one another, since the RDBMS does not know where the data is stored. Interference happens when two threads access the same disk at the same time, which causes frequent head movements and reduces the data transfer rate.

In another proposed solution, the file is divided into partitions and the partitions are sent to different processes that can be executed independently. The processes may or may not interfere with one another, since they do not know the physical placement of the data.

In yet another proposed solution, a low level process monitors the input/output activity of users and, when it appears that sequential access is being used, the process initiates large multi-block reads in anticipation of the application requirement.

There are also "massively parallel" solutions where each set of disks has its own processor so that a search can be split between multiple processors.

The object of the present invention is to provide an improved technique for parallel searching.

SUMMARY OF THE INVENTION

According to the invention there is provided a data processing system comprising a plurality of data storage units and an application which generates a search request specifying a list of data areas to be searched within one or more files, characterised by:
(a) means for creating a mapping table, indicating the way in which the files are mapped on to the data storage units;
(b) means for utilising said list of data areas and said mapping table to create a plurality of search lists, one for each of the data storage units, each search list identifying the data areas or parts thereof that are mapped on to a respective one of the data storage units; and
(c) means for initiating a plurality of searches in parallel on respective data storage units, using the search lists.

DESCRIPTION OF AN EMBODIMENT OF THE INVENTION

One parallel searching technique in accordance with the invention will now be described by way of example with reference to the accompanying drawings.

Figure 1:
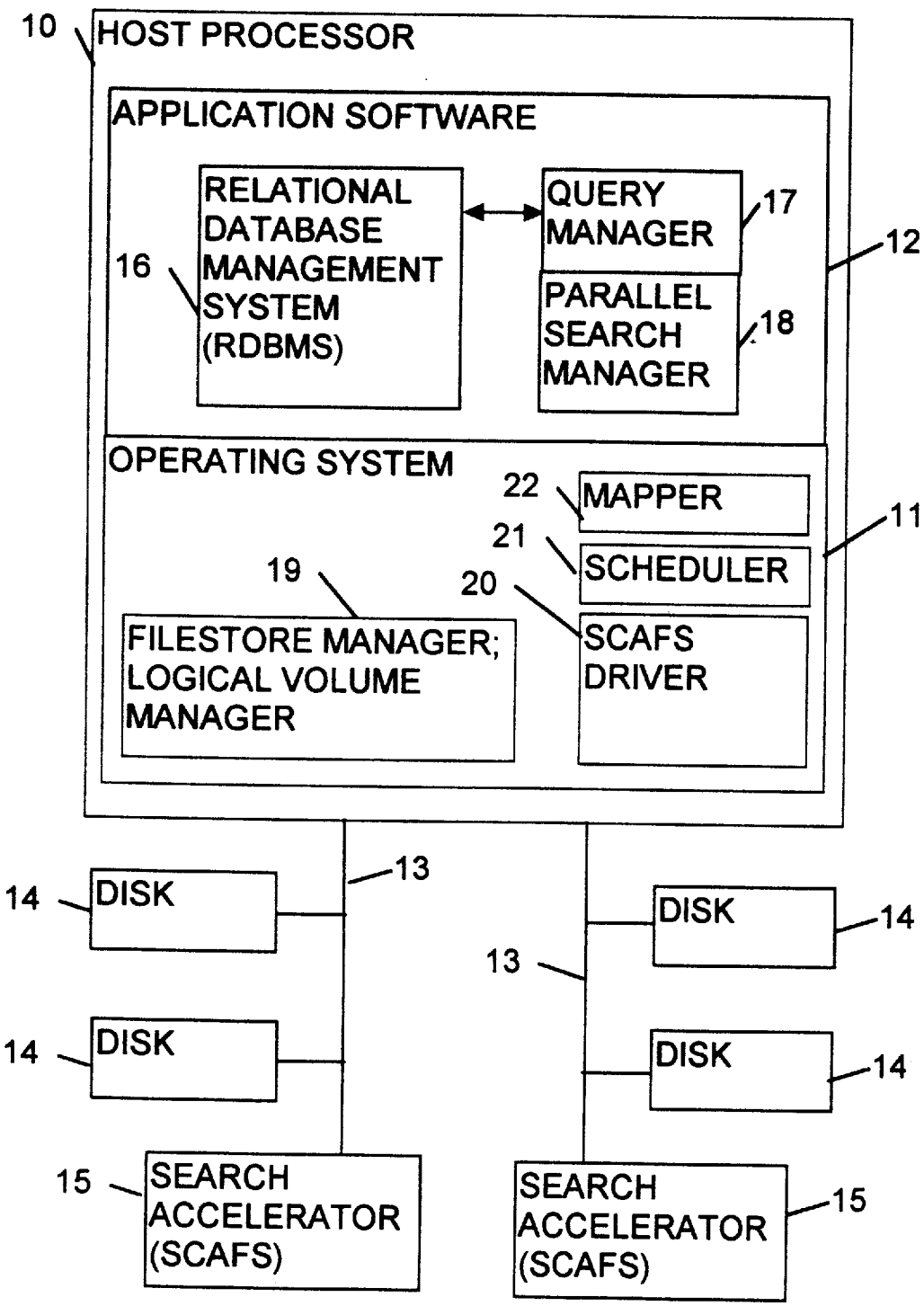
FIG. 1 is a block diagram of a computer system using a parallel searching technique in accordance with the invention.

FIG. 1 shows a computer system comprising a host processor 10, having an operating system 11 and application software 12. The host processor may, for example, be an ICL DRS 6000 processor, and the operating system may be the ICL NX operating system.

The host processor has a number of SCSI channels 13 (two in this example), each of which connects to a number of disk drives 14. Each SCSI channel also has a search accelerator unit 15 connected to it, for performing searches on the data stored in the disks. The search accelerator units 15 are, in this example, ICL SCAFS units, supplied by International Computers Limited.

The applications software includes a relational database management system (RDBMS) 16, a query manager 17, and a parallel search manager 18. The RDBMS and the query manager are conventional, and so will not be described in detail. The parallel search manager will be described in more detail later.

The operating system includes a filestore manager and a logical volume manager 19, a SCAFS driver 20, a scheduler 21, and a filestore mapper 22. The filestore and logical volume managers 19 may be conventional and so will not be described in detail. The SCAFS driver 20 is a driver supplied by International Computers Limited, for interfacing between the operating system and the SCAFS units. The filestore mapper 22 will be described in more detail below.

The RDBMS 16 manages a relational database, stored on the disks. The database storage space consists of a number of files. Each file comprises of a number of data areas, referred to as extents, each of which consists of a set of contiguously addressed blocks.

The function of the filestore mapper 22 is to generate a mapping table, representing the way a specified file is mapped on to the physical disks. When called, the mapper 22 interfaces with the filestore and logical volume managers 19 to retrieve mapping information about the file. It may also lock the file against relocation actions by other users. The mapper 22 returns a mapping table, representing the mapping of the file as a tree structure, along with an indication of the number of entries in the table.

The mapping table contains a sequence of entries, each representing a component in a tree structure. Each entry has the following fields:

Level number
Number of components
Type
Type-dependent data.

Level number indicates the level of the component within the tree structure. Level 0 is the root of the tree.

Number of components indicates how many components (if any) are attached to this component in the next level of the tree structure.

Type indicates the type of component. The following types are defined:

file system: a file stored in a file system.

raw: a logical volume stored as all or part of a physical disk.

concat: a logical volume which is the concatenation of one or more component logical volumes striped: a logical volume which is striped, with a fixed stripe size, over a set of component logical volumes of the same size. Striping assigns logically consecutive segments of a volume to a fixed set of component volumes on a round robin basis-a, b, c, a, b, c . . . .

mirrored: a logical volume which is mirrored, with the information being replicated over two or more logical volumes of the same size.

Type-dependent data is specified as follows:

file system: name raw: disk name, offset and length concat: logical volume name, size striped: stripe size mirrored: size.

The disk name indicates which channel the disk is attached to, and its SCSI address on that channel.

For example, the mapping table for a file might contain the following entries:

| Level number | Number of components | Type | Type-dependent data |
|---|---|---|---|
| 0 | 3 | concat | volume A, size = 8 Mb |
| 1 | 0 | raw | disk 1, offset = 0, length = 2.5 Mb |
| 1 | 0 | raw | disk 2, offset = 48 k, length = 3 Mb |
| 1 | 0 | raw | disk 3, offset = 2 Mb, length = 2.5 Mb |

Figure 2:
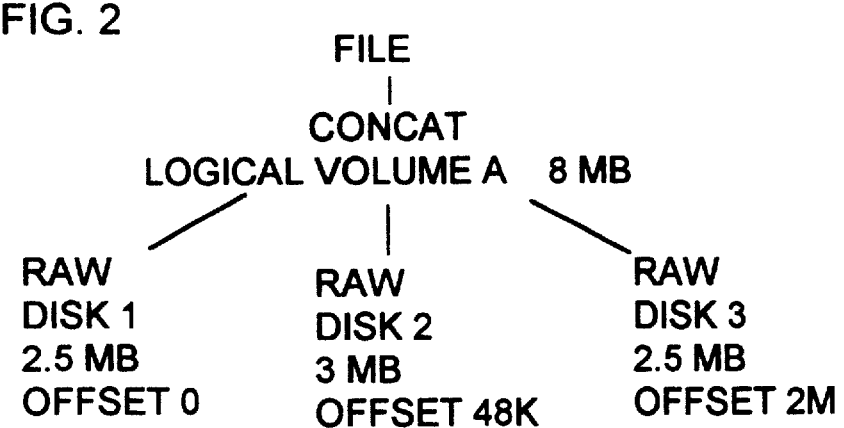
FIG. 2 is a diagram showing a tree structure representing the mapping of a file on to a set of physical disks.

This mapping table represents a file which is mapped to a logical volume A, which in turn is mapped to three fragments, each stored on a separate physical disk. This mapping can be represented graphically as a tree structure, as shown in FIG. 2.

When the RDBMS receives a database query, it analyses the query to discover which files and which extents within those files it requires to access in order to answer the query. From this analysis, the RDBMS generates a dataspace extent list, comprising a number of entries, one for each of the extents to be accessed. Each entry includes the following items:

A file reference (file descriptor or full file name).

The offset of the start of the extent relative to the start of the file.

The length of the data area to be searched in this extent.

The RDBMS then sends a bulk input request to the parallel search manager. The bulk input request comprises two items:

the number of extents to be searched a pointer to the dataspace extent list.

Figure 3:
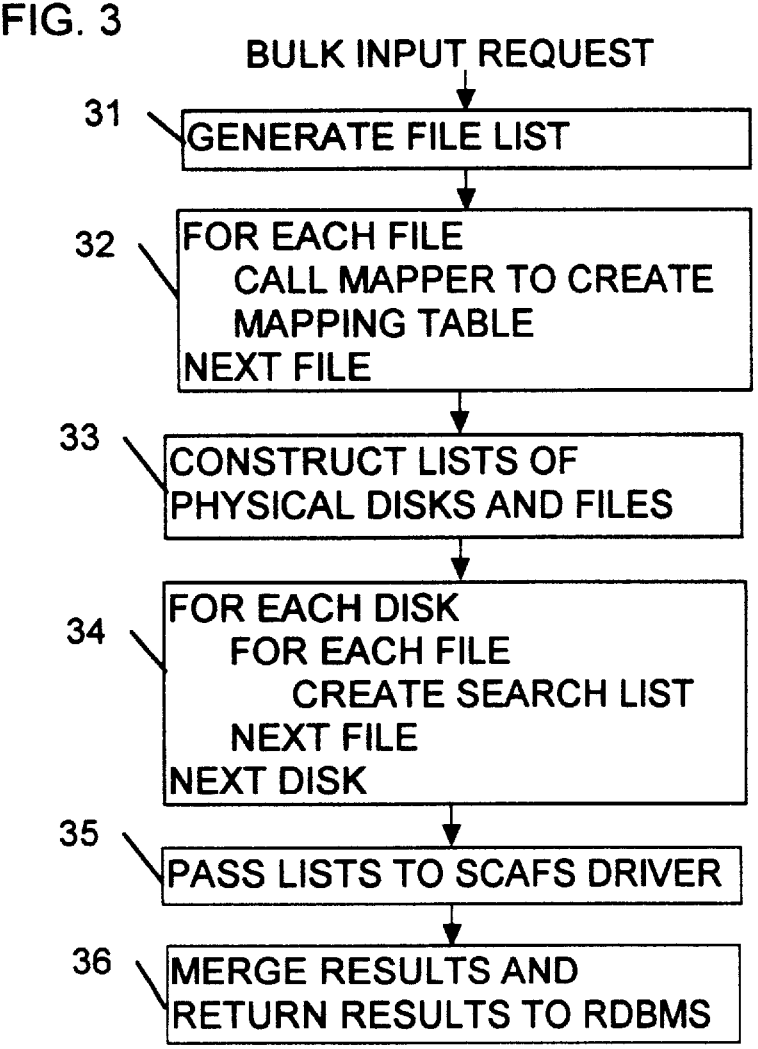
FIG. 3 is a flow chart showing the operation of a parallel search manager.

FIG. 3 is a flow chart showing the operation of the parallel search manager 18, when it receives a bulk input request from the RDBMS.

(Step 31) The parallel search manager first scans the dataspace extent list to identify which files are referenced in this list. This step generates a file list, comprising the following information:

the number of files a set of pointers to the files.

(Step 32) For each file in the file list, the parallel search manager makes a request to the mapper 22 via a system call. In response to each request, the mapper returns a mapping table as described above, indicating how the file is mapped on to the physical disks.

(Step 33) Using the mapping tables returned by the mapper, the parallel search manager constructs a list of the physical disks that might be involved in the search, and of the file or files that may have data on each disk.

(Step 34) The parallel search manager then performs an outer loop, which selects in turn each of the physical disks that might be involved in the search. Within this outer loop, there is an inner loop, which selects in turn each of the files that may have data on the currently selected disk. The inner loop contains a "Create Search List" routine. This routine generates a search list, identifying the extents, or parts of extents, of the selected file that map on to the selected disk. The extents in the search list are identified in logical terms (that is as file, offset, length) and so the list is still valid even if a disk mirror has failed or a file system has tidied itself.

The "Create Search List" routine is described in detail below, with reference to FIG. 4.

(Step 35) When all the required search lists have been created, each list may be independently passed to the SCAFS driver 20, with a request for it to initiate a search through the specified extents on the specified disk.

The SCAFS Driver translates the file offsets to disk offsets (disk addresses) and passes the lists to the respective SCAFS units. Several SCAFS searches are initiated in parallel, so that all the affected disks are busy at the same time. Each SCAFS unit performs the requested searches and returns a stream of selected rows or records to the host.

Alternatively, a disk search could be started as soon as the first non-empty search list has been generated. It is also possible to limit the number of parallel searches and to generate new search lists as executing searches are completed. This is useful as it is better to allocate parallel disk searches to different SCSI channels and spread the load on system resources.

(Step 36) The parallel search manager checks for return data on each stream, and merges the results of all the streams for the RDBMS as they become available.

Figure 4:
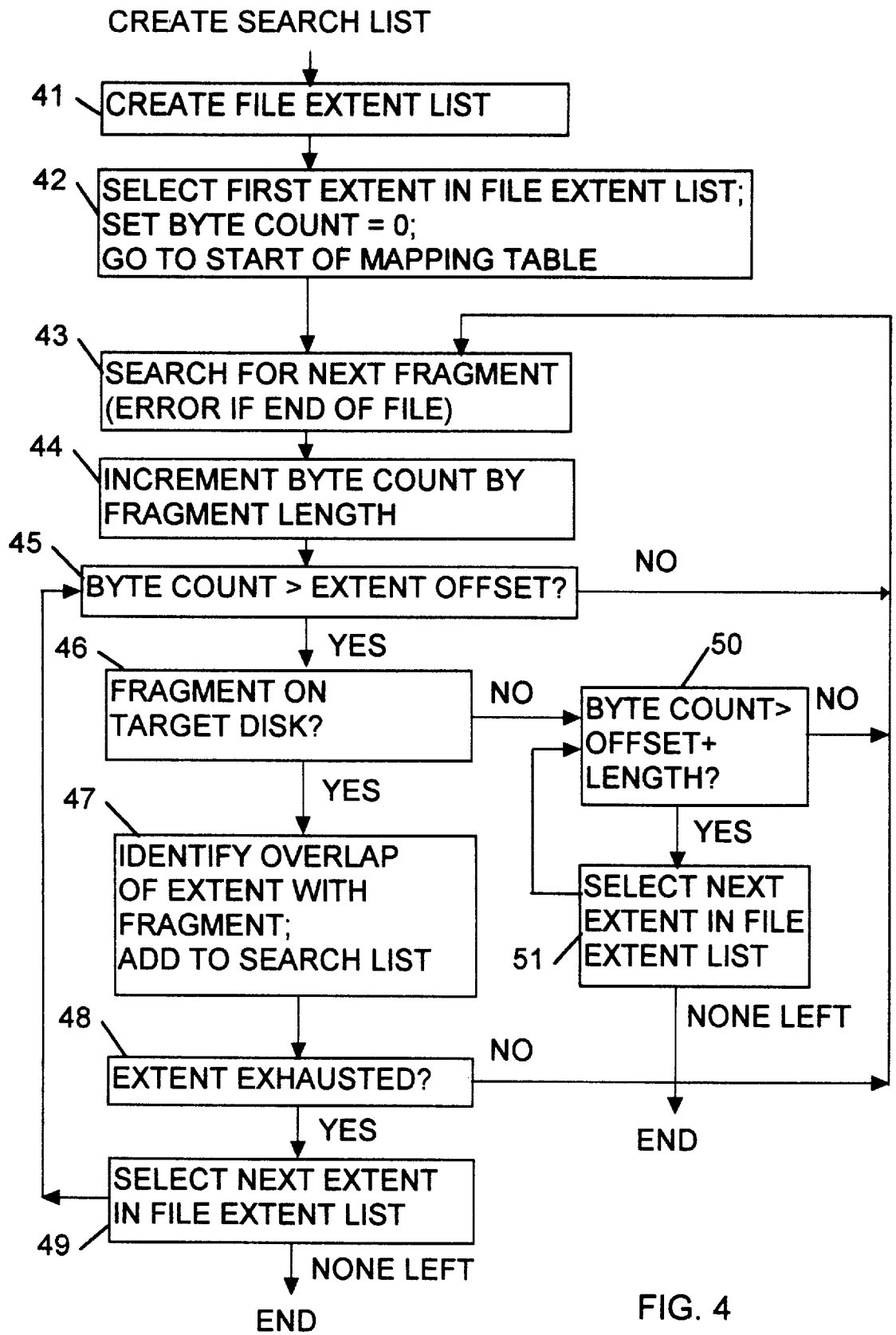
FIG. 4 is a flow chart showing the operation of a routine forming part of the parallel search manager.

FIG. 4 shows the "Create Search List" routine mentioned above, for identifying the portions of the current target file that map on to the current target disk.

(Step 41) The routine scans the dataspace extent list supplied by the RDBMS, and from this creates a file extent list, consisting of a list of the extents to be searched in the currently selected file, in ascending offset order.

(Step 42) The routine initialises a byte count value to zero, and selects the first extent on the file extent list. It also positions a pointer at the start of the mapping table.

(Step 43) The routine then advances the pointer through the mapping table, searching for the next entry relating to a physical disk fragment. (That is, an entry of the type "raw").

(Step 44) When the next entry relating to a fragment is found, the routine increments the byte count by adding the length of the fragment. The byte count therefore indicates the position of the end of the fragment.

(Step 45) The routine then checks whether the byte count is greater than the offset value of the currently selected extent, i.e. whether the extent maps (at least partially) into the fragment. If so, the routine proceeds to Step 46; otherwise, it returns to Step 43 above, to search for the next fragment.

(Step 46) The routine checks whether the fragment is on the target disk (i.e. the currently selected disk). If so, the routine proceeds to Step 47; otherwise it proceeds to Step 50.

(Step 47) If the fragment is on the target disk, the routine identifies the overlap between the extent and the fragment. It then creates an entry in the output search list, this entry including the file name, offset and length of the overlap area. (As an added refinement the disk offset can also be included in the entry, and used to order the disk search extents and minimise disk head movement.)

(Step 48) The routine then checks whether the currently selected extent has been exhausted, i.e. whether the byte count is greater than the sum of the extent's offset and length. If so, the routine proceeds to Step 49. If, on the other hand, the extent has not been exhausted (i.e. the extent continues into the next fragment), the routine returns to Step 43 above, so as to search for the next fragment.

(Step 49) If the currently selected extent has been exhausted, the next extent in the file extent list is now selected, and the routine returns to Step 45 above.

(Step 50) If the currently selected fragment is not on the target disk, the procedure checks whether the byte count is greater than the sum of the extent's offset and length, i.e. whether the currently selected extent terminates within the fragment. If so, the routine proceeds to Step 51; otherwise, returns to Step 43 above, so as to search for the next fragment.

(Step 51) The routine selects the next extent in the file extent list, and returns to step 50.

The above loop, comprising Steps 43–51, is repeated until it is found (at Step 49 or 51) that there are no more extents in the file extent list to be processed. If the end of the mapping table is reached before this, (i.e. there are no more fragments to process), an error has occurred.

For mirrored volumes the search for the fragment follows one mirror only. The actual decision on the mirror to be searched is taken by the operating system.

SUMMARY

In summary, the parallel query manager accepts a list of extents to be searched and organises them into an efficient sequence for searching. This enables an extremely high data search rate to be achieved.

This solution has the following benefits:

It is architecturally simpler than multi-process or multi-threading solutions.

It takes account of physical data placement so can be optimised to minimise disk head movement and maximise data input rates.

The search activity can be scheduled to make best use of system resources.

It does not rely on availability of multiple processors and is quite effective even when only one processor is available.

SOME POSSIBLE MODIFICATIONS

It will be appreciated that many modifications may be made to the system described above without departing from the scope of the present invention.

Figure 5:
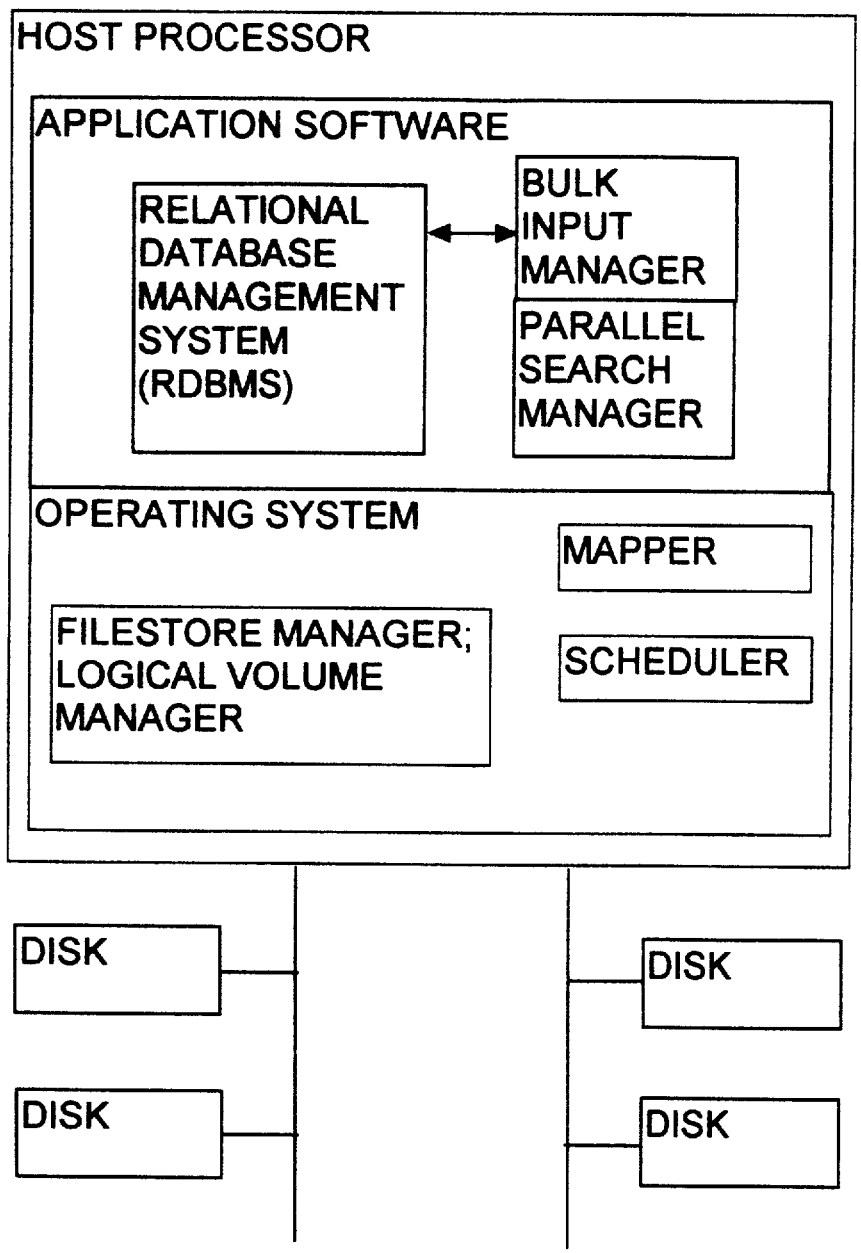
FIG. 5 is a block diagram of an alternative computer system using a parallel searching technique in accordance with the invention.

For example, instead of using search processors, the searching may be done by the RDBMS itself. In this case, the parallel search manager would be used in the same way as described above, to create lists of search areas to for each disk. A bulk input manager, resident in the host processor, would then use these lists to drive a series of asynchronous block reads through the disk driver, so as to read the required data into the host, for searching by the RDBMS. This possibility is illustrated in FIG. 5.

I claim:

1. A data processing system comprising:

(a) a plurality of data storage units;

(b) a plurality of search units for performing searches on respective ones of said data storage units in parallel;

(c) an application which generates a search request specifying a list of data areas to be searched within one or more files;

(d) means for creating a mapping table, indicating the way in which the files are mapped on to the data storage units;

(e) means for utilising said list of data areas and said mapping table to create a plurality of search lists, one for each of the data storage units, each search list identifying data areas, or parts thereof, that are mapped on to a respective one of the data storage units; and (f) means for passing said search lists to respective ones of said search units, along with requests to initiate searches on said data areas identified in the search lists.

2. A data processing system according to claim 1 wherein said means for utilising said list of data areas and said mapping table to create a plurality of search lists comprises:

(a) computer means for performing an outer program loop, in respect of each of said data storage units, and an inner program loop in respect of each of said files; and (b) means within said inner program loop for finding the data areas or parts thereof within a particular target file that map on to a particular target disk.

3. A data processing system according to claim 1 further comprising means for merging the results of said plurality of searches and for returning the merged results to said application.

4. A data processing system according to claim 1 wherein said application is a relational database management system.

5. A data processing system according to claim 1 wherein said data storage units are magnetic disk storage units.

6. A data processing system according to claim 1 wherein said means for creating a mapping table is resident within the operating system of the data processing system.

7. A data processing system according to claim 1 wherein said search units comprise search accelerator units.

* * * * *